United States Patent [19]
Kurimoto et al.

[11] 3,851,380
[45] Dec. 3, 1974

[54] MACHINE TOOL WITH TOOL MODULE STORAGE AND CHANGING MEANS

[76] Inventors: Mikishi Kurimoto, 114-10, Arimatsuura, Narumi-cho, Midori-ku, Nagoya-shi, Aichi-ken; Yoshiki Ochiai, 29, Kitatouraku, Fukuoka-cho, Okazaki; Kenji Nomura, 42-1, Kitashinden, Ogawa, Higashiura-cho, Aichi-ken; Toshio Inagaki, 30, Yamanaka, Ogawa-cho, Anjo, all of Japan

[22] Filed: Apr. 13, 1973

[21] Appl. No.: 350,717

[30] Foreign Application Priority Data
Apr. 13, 1972 Japan.............................. 47-37269

[52] U.S. Cl. .................................................. 29/568
[51] Int. Cl. ............................................. B23q 3/157
[58] Field of Search ............................ 29/568, 33 D

[56] References Cited
UNITED STATES PATENTS

| | | | |
|---|---|---|---|
| 3,188,736 | 6/1965 | Brainard et al. ....................... | 29/568 |
| 3,509,619 | 5/1970 | Lipp......................................... | 29/568 |
| 3,650,018 | 3/1972 | Perry et al. ............................. | 29/568 |
| 3,762,036 | 10/1973 | Goebel et al. ......................... | 29/568 |

*Primary Examiner*—Andrew R. Juhasz
*Assistant Examiner*—Z. R. Bilinsky
*Attorney, Agent, or Firm*—Oblon, Fisher, Spivak, McClelland & Maier

[57] ABSTRACT

A machine tool is provided with a polygonal storage magazine which is mounted on and rotatable about a horizontal pivot provided by a frame. The storage magazine has a plurality of axial guide ways on the periphery thereof, each of the guide ways slidably carrying in a queue line a plurality of tool modules to be used in a rotatable spindle in sequence to perform a number of different machining operations on a workpiece. A first transfer means conveys a new tool module from the storage magazine for use in the spindle, while a second transfer means conveys another tool module which has just been used by the spindle back to the storage magazine. An index device rotatably indexes the storage magazine so as to connect a selected guide way to the first and the second transfer means in the same plane. A feed device operates to feed the new tool module from the front or beginning of the queue line to the first transfer means and immediately to also feed the used tool module from the second transfer means to the end of the queue line.

5 Claims, 12 Drawing Figures

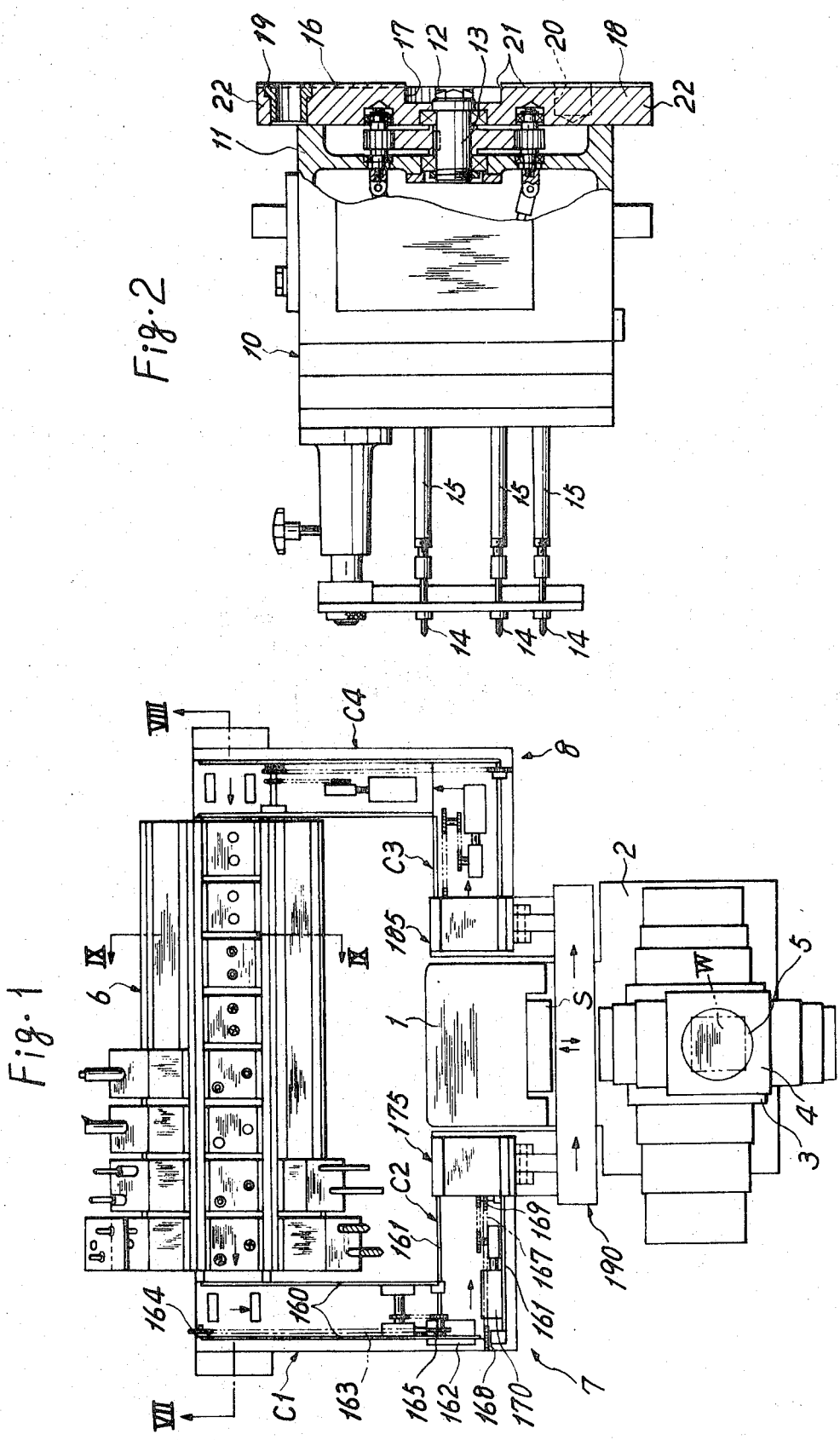

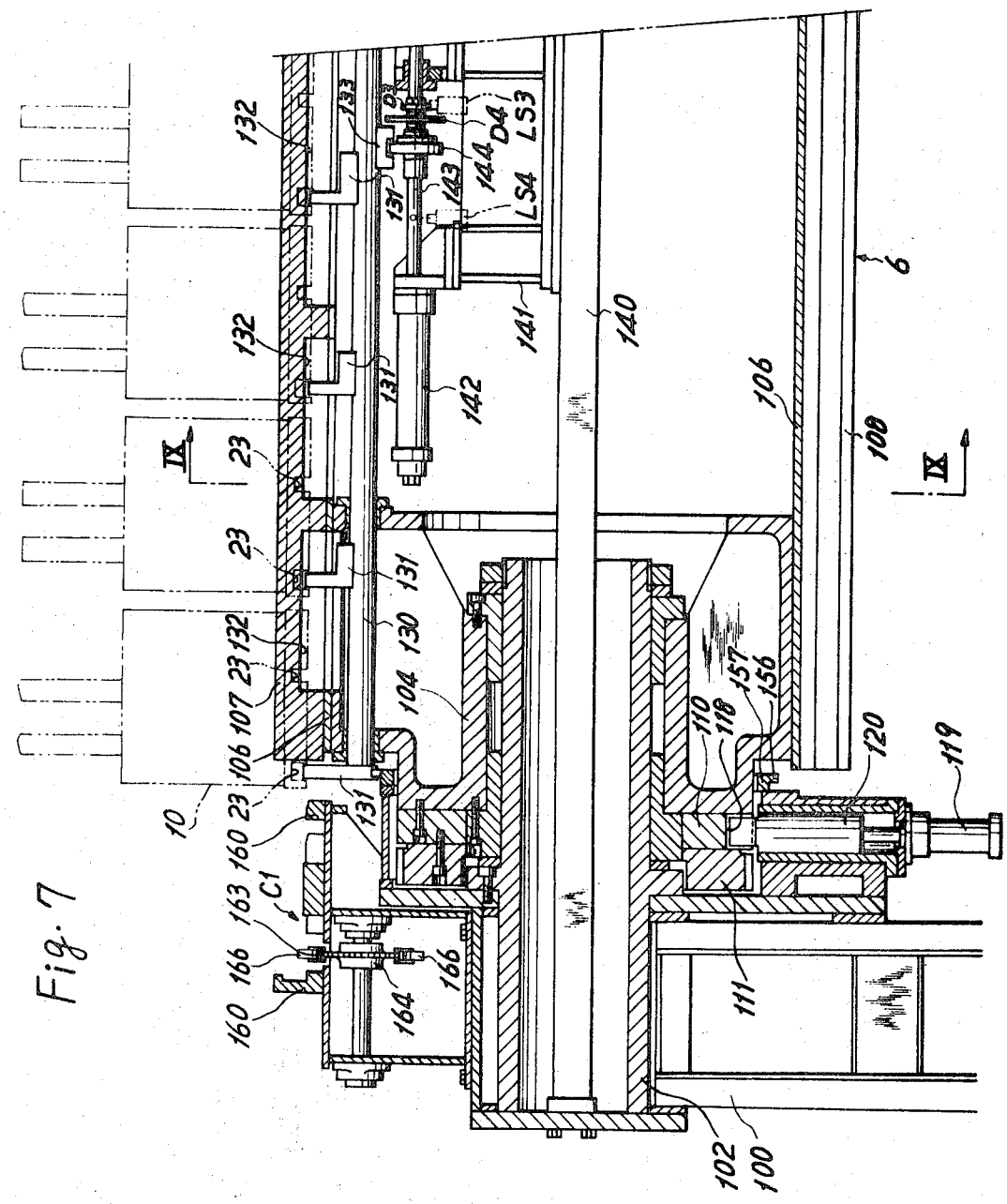

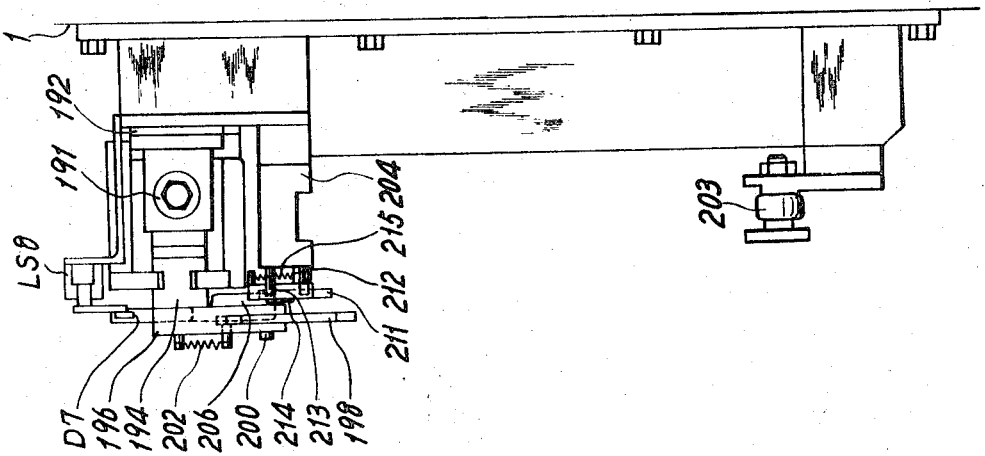
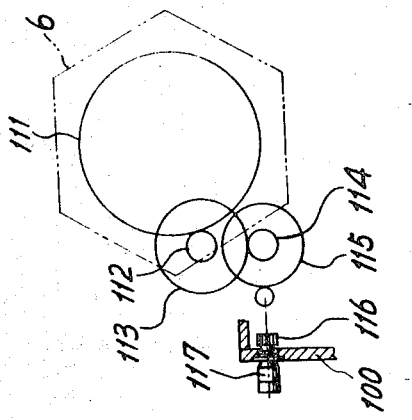

MACHINE TOOL WITH TOOL MODULE STORAGE AND CHANGING MEANS

BACKGROUND OF THE INVENTION

The present invention relates to machine tools, and more particularly to a machine tool with tool module storage and changing capability wherein a number of different tool modules are stored on the periphery thereof, each tool module having a plurality of tools thereon being adapted to be transferred to the machining station on a rotatable spindle and to be automatically secured thereon and removed therefrom.

With workpieces having a large number of parallel holes, machining efficiency is raised by the use of multiple spindle machine tools with tool module storage and changing capability that are capable of simultaneously performing a plurality of machining operations on any one of a large number of different workpieces more than by the use of single spindle machine tools with tool storage and changing capability. Very often, however, such multiple spindle machine tools are too large in size in order to have a considerably large module storage magazine, particularly in case a plurality of different tool modules are required to perform machining operations on a workpiece. Furthermore, transfer devices for tool modules generally are large, complicated and expensive in construction, and also it is difficult to reduce to a minimum the unproductive periods of transferring and tool module-changing operations, during which of course the workpiece is not being machined.

SUMMARY OF THE INVENTION

It is, therefore, an object of the present invention to provide an improved machine tool with a compact and inexpensive tool module storage and changing apparatus.

It is another object of the present invention to provide an improved machine tool with a simple polygonal storage magazine having a plurality of axial guide ways thereon which slidably carry a plurality of queue lines of tool modules, respectively, tool modules of each queue line being used in sequence at the rotatable spindle.

It is still another object of the present invention to provide an improved machine tool with a polygonal storage magazine which is rotatable about a horizontal pivot to be indexed so that a selected guide way thereon may be connected to transfer devices at its ends in the same height.

A further object of the present invention is to provide an improved machine tool with tool module-changing capability in which the periods of unproductive operation are reduced to a minimum.

Briefly, according to the present invention these and other objects are achieved by providing a multiple spindle machine tool with a tool module storage and changing apparatus wherein a column slidably mounts a housing having a rotatable spindle thereon, a polygonal storage magazine is rotatably mounted about pivots on a frame, and a plurality of axial guide ways are formed on the periphery of the polygonal storage magazine, each of the guide ways slidably carrying in a queue line a plurality of tool modules to perform a number of different operations on a workpiece. A first transfer device is located between one side of the storage magazine and the column for conveying a new tool module from the storage magazine for use at the rotatable spindle, while a second transfer device is located between another side of the storage magazine and the column for conveying an old tool module which has just been used at the rotatable spindle back to the storage magazine. An index device is provided to rotatably index the polygonal storage magazine so as to connect a selected guide way to the first and the second transfer devices at both ends thereof. A feed device is mounted on the frame for feeding the new tool module from the beginning of the queue line on the selected guide way to the first transfer device and immediately to feed the old tool module from the second transfer device to the end of the queue line. A changing device is traversely mounted on the column to remove the old tool module from the rotatable spindle and immediately to move the new tool module into the rotatable spindle.

BRIEF DESCRIPTION OF THE DRAWINGS

The foregoing and other objects of the present invention will be more fully appreciated as the same becomes better understood from the following detailed description of a preferred embodiment when considered with the accompanying drawings, in which like reference numerals designate like or corresponding parts throughout the several views, and wherein:

FIG. 1 is a top plan view of a machine tool embodying the principles of the present invention;

FIG. 2 is an enlarged and fragmentally sectional view showing the tool module;

FIGS. 7 and 8 are enlarged and longitudinally sectional views of the storage magazine, taken along the line VII–VIII of FIG. 1;

FIG. 10 is a schematical view showing the drive mechanism to rotate the storage magazine;

FIG. 11 is a side view of the turning platform on both sides of the column; and

FIG. 12 is a side view of the module changer.

DETAILED DESCRIPTION OF THE PREFERRED EMBODIMENTS

An embodiment according to the present invention will now be described with reference to the drawings and most particularly to FIG. 1 thereof, wherein the principle according to the present invention is partly schematically shown by top plan view.

A machine bed 2 fixedly mounts a vertical column 1 on which a spindle head S with a rotatable spindle 65 is slidably mounted in the vertical direction. A main table 3 is traversely slidable on the machine bed 2 in the front of the vertical column 1. Transversely slidable on the main table is a cross table 4 on which a rotary table 5 is rotatably mounted to secure a work pallet mounting a workpiece thereon. Pulse motors, not shown, are mounted to control the movements of the main table 3, cross slide 4 and spindle head S in accordance with numerical information so that the workpiece and the spindle head S may be moved in the directions of three dimensions relative to each other, and furthermore each surface of the workpiece to be machined may be selectively faced to the spindle head S by the indexing operation of the rotary table 5, as is well known to those skilled in the art.

Figure 6:
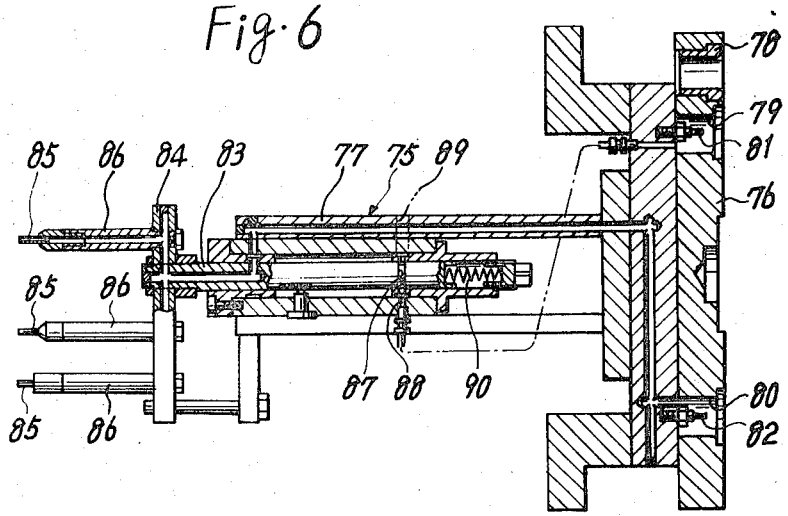
FIG. 6 is a fragmentally sectional view of the inspection module.
Figure 9:
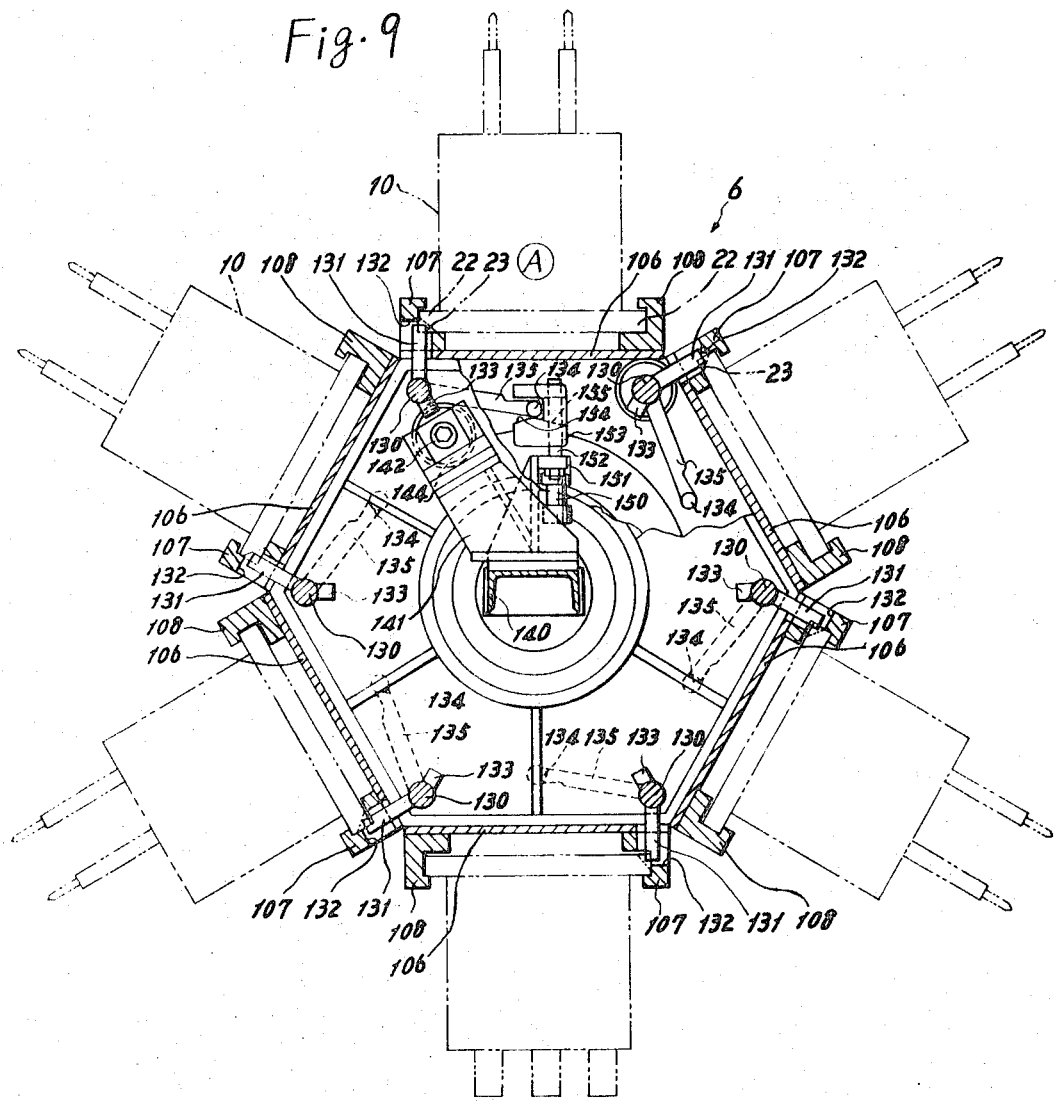
FIG. 9 is a transversely sectional view of the storage magazine, taken along the line IX—IX of FIG. 1.

Behind the vertical column 1 is horizontally mounted a rotatable storage magazine 6 of a regular polygonal or hexagonal drum, on the periphery of which a plurality, being six in number in the illustrated embodiment, of angularly spaced guide ways having rails 107, 108 and a plate 106, best shown in FIG. 9, are longitudinally located so as to be capable of storing a plurality of tool modules 10, shown best in FIG. 2, and inspection modules 75, as seen in FIG. 6, thereon longitudinally in a queue. Each module on the guide ways has tool spindles 15 or nozzle holes 86 thereon which extends in the direction perpendicular to the periphery of the storage magazine 6.

Figure 8:
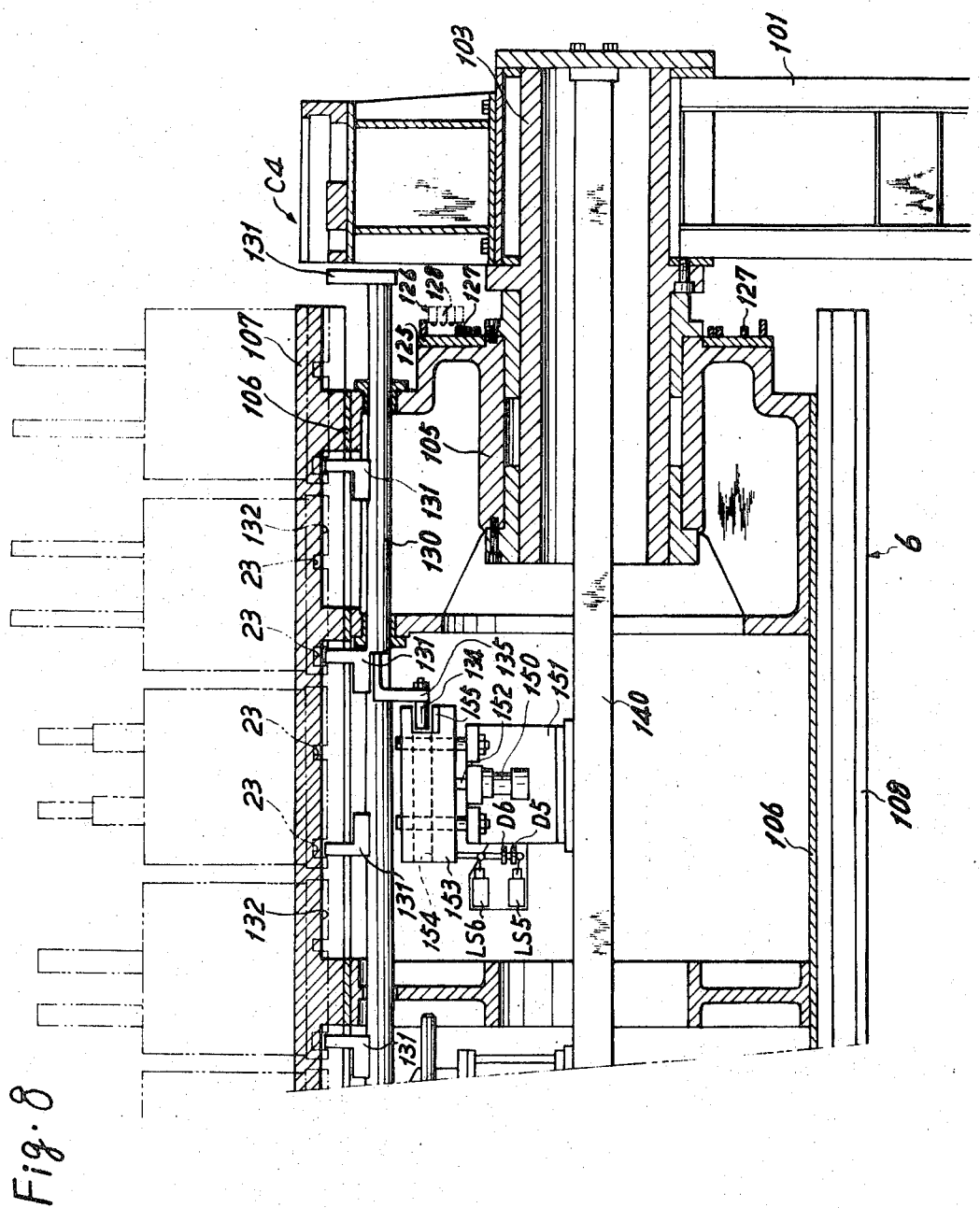

Provided between the storage magazine 6 and the vertical column 1 are a first transfer device 7 located on the left of the storage magazine 6 to convey a new module from the magazine 6 for use at the spindle 65 and a second transfer device 8 located on the right of the storage magazine 6 to convey an old module which has just been used at the spindle 65 back to the magazine 6. An index device is provided to rotatably index the storage magazine 6 to a loading and unloading position A at the top of the magazine 6 as shown in FIG. 9 so as to connect the guide way, which carries a module or modules in a queue to be used in sequence at the spindle 65 to perform a number of machining operations on a workpiece, to the first and the second transfer devices 7 and 8. A feed mechanism shown in FIGS. 7 and 8 is mounted within the storage magazine 6 to transfer the new module from the beginning of the queue line on the guide way to the end of the first transfer device 7 and immediately to transfer the used module from the end of the second transfer device 8 to the end of the queue line.

Component parts of the machine tool are described hereinafter in detail.

TOOL MODULE

FIG. 2 shows the tool module 10 which is used for relatively light machining operations, such as drilling. The housing 11 of the tool module 10 rotatably mounts several tool spindles 15 extending in one direction and an input shaft 13 extending in another direction and having clutch teeth 12 on the end thereof. The tool spindles 15 are adapted to secure drills or the like thereto. The input shaft 13 is drivingly connected to each of the tool spindles 15 by a well-known rotation-transmitting mechanism. Fixedly mounted on the housing 11 is an attaching plate 18 on which an attaching surface 16 is formed, and a recess 17 is further formed on the central portion of the attaching surface 16. The clutch teeth 12 of the input shaft 13 project beyond the inner end of the recess 17 to the vicinity of the attaching surface 16. A pair of positioning bushes 19, only one of which can be seen in FIG. 2, are secured to the attaching plate 18 to receive positioning pins 38 and 39, shown in FIGS. 3, 4 and 5, when the tool module 10 is attached to the spindle head S. The attaching plate 18 has guide grooves 21 intersecting each other at the recess 17 and flanges 22 projecting on opposite sides thereof.

SPINDLE HEAD

Figure 3:
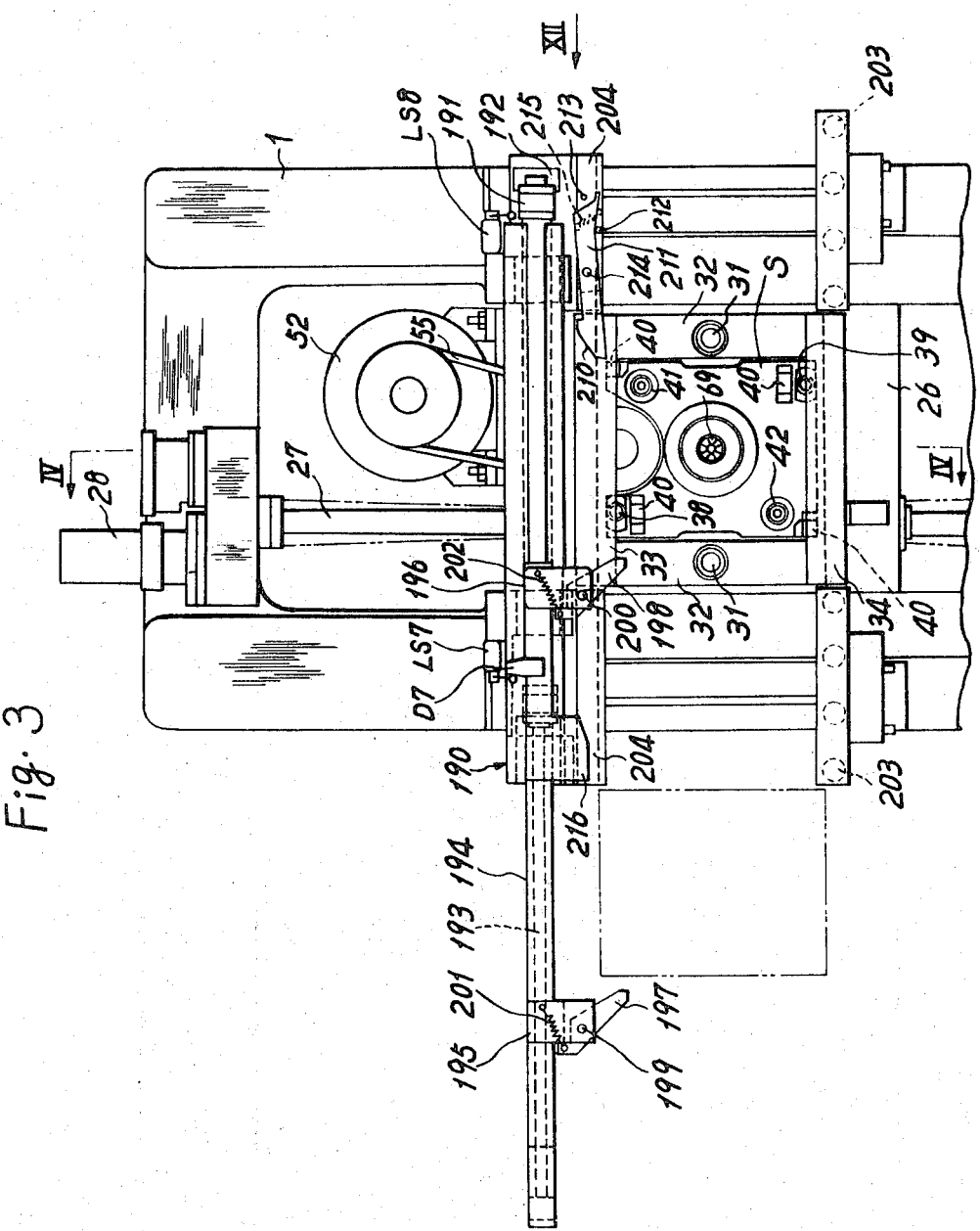
FIG. 3 is a front view, partly broken away, of the module changer and the spindle head.
Figure 5:
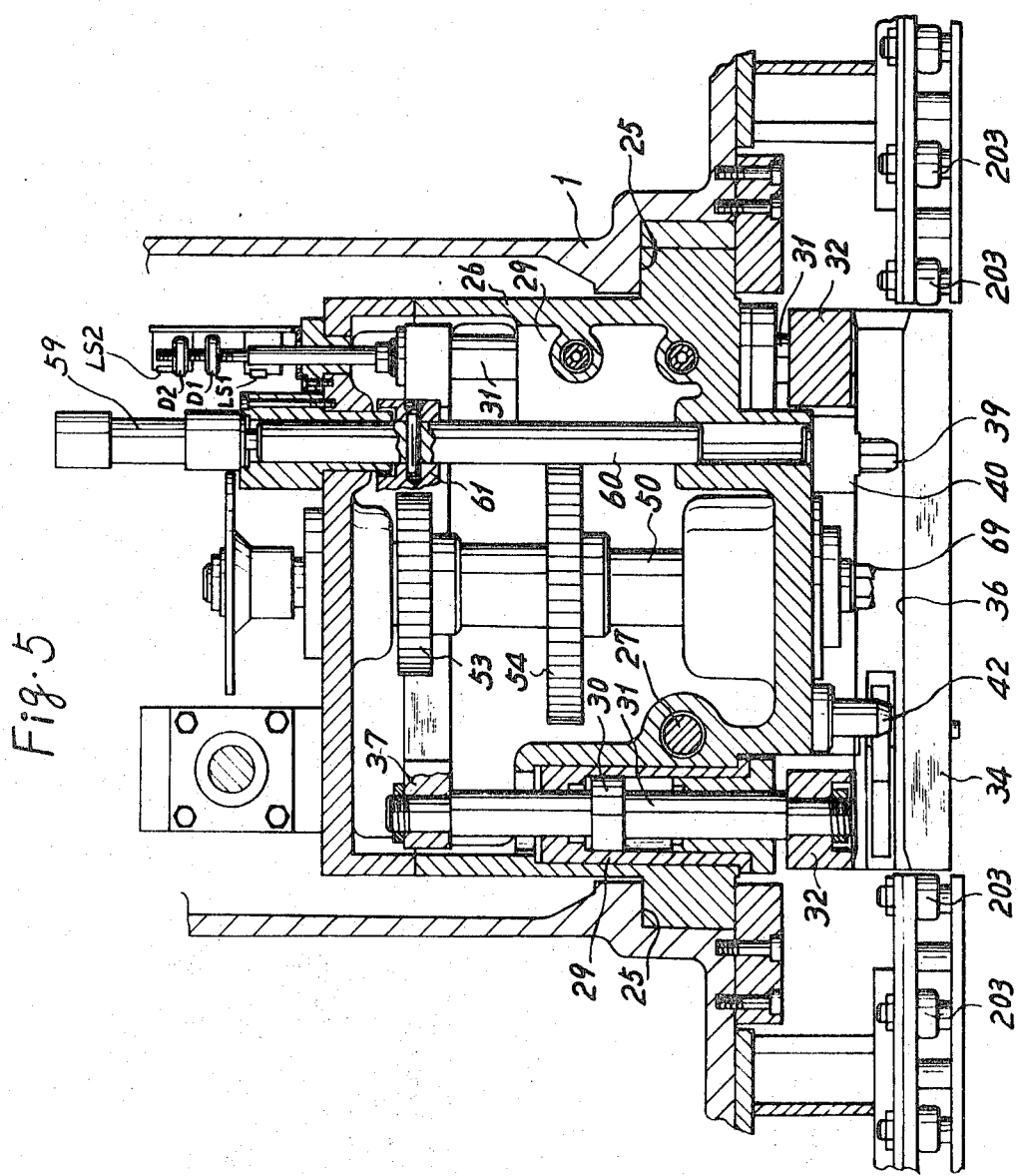
FIG. 5 is a horizontal sectional view of the spindle head.

The housing 26 of the spindle head S is slidably mounted on vertical guide ways 25, 25 formed on the column 1. A feed motor 28 is mounted on the top of the column 1 in driving engagement with a feed shaft 27 which is threadedly engaged with the housing 26 to vertically move the same, as shown in FIGS. 3 and 5. Mounted on the left and right end portions of the housing 26 are a pair of cylinders 29, 29 which slidably receive pistons 30, 30 and piston rods 31, 31 therein. Connecting members 32, 32 are vertically secured to the piston rods 31, 31 on the upper and lower ends of which clamps 33 and 34 are traversely secured, respectively, as shown in FIG. 3. Engaging surfaces 35 and 36 are formed on the clamps 33 and 34 in opposing and parallel relation with the front of the housing 26 so as to clamp the attaching plate 18 of the module on the housing 26. The piston rods 31, 31 are connected to each other by a connecting rod 37 so as to be synchronously moved. The completion of clamping and unclamping operations are confirmed by limit switches LS1 and LS2 which are operated respectively by dogs D1 and D2.

Figure 4:
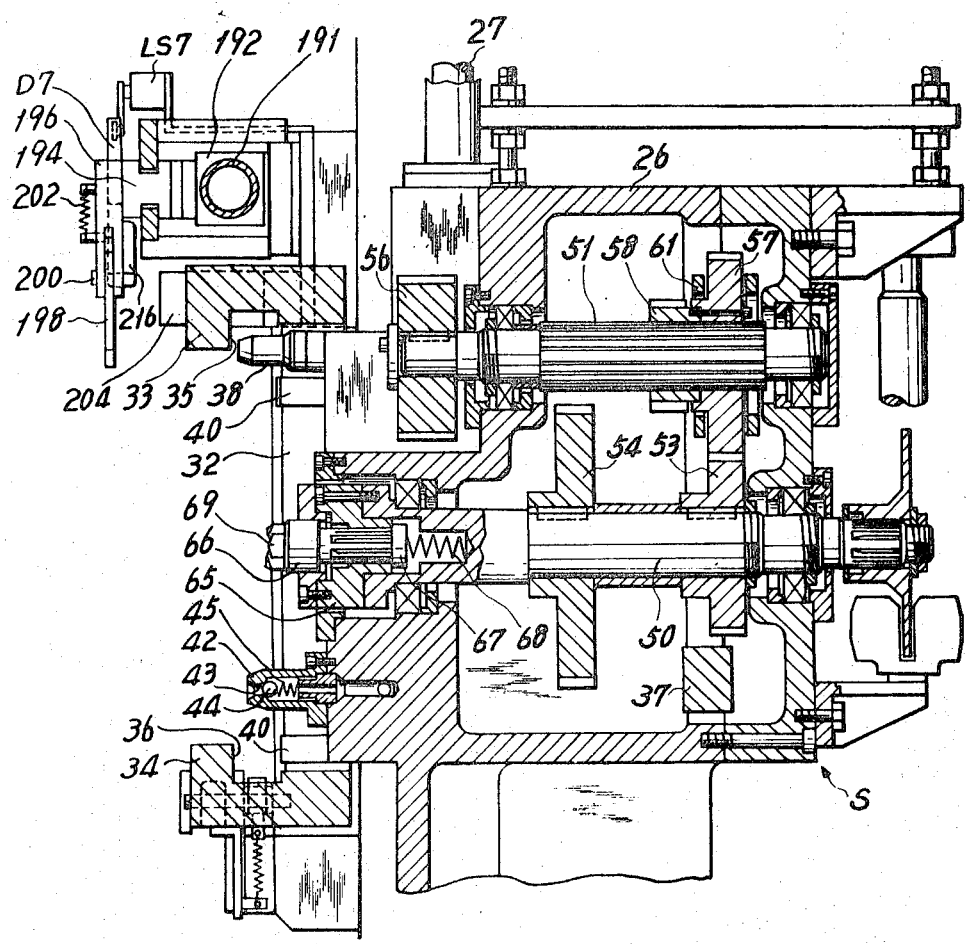
FIG. 4 is a vertical sectional view of the module changer and the spindle head, taken along the line IV—IV of FIG. 3.

In FIGS. 3 and 4, the positioning pins 38 and 39 are secured to the front of the housing 26 to position the module in place. A pair of sheet pads 40, 40 are diagonally mounted at the corners of the front of the housing 26. When the module 10 has been fed to the position within the clamps 33 and 34 where the positioning bushes 19 of the module 10 axially face the positioning pins 38 and 39, the module 10 is fixed on the sheet pads 40, 40 by the clamps 33 and 34 while being positioned.

Provided on the front of the housing 26 are air-supplying nozzles 41 and 42 for a measuring and a cleaning operation. At each throat of the nozzles 41 and 42, a ball 44 is normally urged by a spring 45 toward the shoulder portion of the throat to shut off the air to be supplied from an air supply source, not shown, through the throat.

In FIG. 4, a spindle 50 is rotatably mounted on the housing 26 in an axial extension of the input shaft 13 of the clamped tool module 10 so as to rotate the tool spindles 15 through the input shaft 13. Within the housing 26 an intermediate shaft 51 is rotatably mounted. A smaller gear 53 for high-speed rotation and a larger gear 54 for low-speed rotation are keyed to the spindle 50. A pulley 56 having meshing teeth thereon is secured to the end of the intermediate shaft 51 to be drivingly connected by a synchronous belt 55 to a drive motor 52 which is mounted on the top of the housing 26. A larger and a smaller intermediate gears 57 and 58 which are integrally secured to each other are slidably mounted on the intermediate shaft 51 and are restrained against rotation. A shift rod 61 is engaged with the intermediate gear 57 to axially shift the intermediate gears 57 and 58 such that these gears 57 and 58 are selectively engaged with the gears 53 and 54, respectively. As shown in FIG. 5 the shift rod 61 is secured to a shift bar 60 which is slidably mounted on the housing 26 and is connected to an actuator 59. Thus, the spindle 50 is drivingly connected to the drive motor 52 by the aforementioned means.

Secured to the end of the spindle 50 is the rotatable spindle 65 having splines on the inner surface thereof, with which a transmitting shaft 66 is in the spline-engagement. A compressive spring 68 is disposed between a flange member 67 and the bore formed on the end of spindle 50. The flange member 67 is secured to the one end of the transmitting shaft 66, and on the other end clutch teeth 69 are formed so as to be complementally engaged with the clutch teeth 12 on the input shaft 13 of the tool module 10.

INSPECTION MODULE

FIG. 6 shows an inspection module 75 which is fixedly mounted on an attaching plate 76 for inspecting the depth of each of the drilled bores and also for cleaning these bores. A pair of positioning bushes 78, only one of which being shown, are secured to the attaching plate 76, in which a pair of connecting holes 79 and 80 are formed to receive the air-supplying nozzles 41 and 42. Operative pins 81 and 82 are mounted on the body 77 of the inspection module 75 so as to project from the bottoms of the connecting holes 79 and 80. When the inspection module 75 is secured to the spindle head S, the operative pins 81 and 82 are inserted into the throats 43 of air-supplying nozzles 41 and 42 to push the ball 44 against the spring 45, thus introducing compressed air from the spindle head S to the inspection module 75.

A sliding member 83 having a holding plate 84 on the outer end thereof is slidably mounted in the body 77 for movement along an axial line. A plurality of nozzle holders 86 having inspection nozzles 85 on the ends thereof are secured to the holding plate 84 respectively at positions thereon corresponding to the tool spindles 15 of the tool module 10. Each inspection nozzle 85 is connected to the connecting hole 80 through a passage formed in the holding plate 84, the sliding member 83 and the body 77. When the connecting hole 80 is connected to the air-supplying nozzle 42, compressed air begins to blow from the inspection nozzle 85 to clean the machined bore.

Formed on the periphery of the sliding member 83 is a peripheral groove 87 which is connected to ports 88 and 89, the port 88 being connected to the connecting hole 79 and the other part 89 being open to the atmosphere. The sliding member 83 is urged by a spring 90 forwardly relative to the body 77 and when the sliding member 83 is positioned at the forward end thereof, the port 88 is opened to the port 89 through the peripheral groove 87. When the sliding member 83 is retracted against the force of spring 90 by the engagement of the inspection nozzle 85 with the bottom of a bore which is not completely bored to a predetermined depth, the ports 88 and 89 are closed by the relative displacement between the peripheral groove and the ports 88 and 89 to thereby operate a pressure switch, not shown, which generates a warning signal.

STORAGE MAGAZINE

In FIGS. 7, 8 and 9, frames 100 and 101 are fixedly mounted on the floor at a regular space behind the column 1 to coaxially mount cylindrical members 102 and 103 therebetween. The storage magazine 6 comprises a pair of regular hexagonal drums 104 and 105 which are rotatably mounted on the cylindrical members 102 and 103 which provide horizontal pivots, respectively, and six plates 106 are secured to and between the peripheries of the hexagonal drums 104 and 105 and form guide ways with rails 107 and 108 to store a plurality of tool and inspection modules 10 and 75 thereon longitudinally in a queue. The pair of rails 107 and 108 which are fixed to each of six plates 106 have opposite grooves thereon to slidably receive the flanges 22 of many different modules, as shown in FIG. 9. Therefore, the tool spindles of tool modules or the nozzle holders of inspection modules extend outwardly in the direction perpendicular to the guide ways.

The guide way carries a module or modules from left to right, in a queue, to be used in sequence at the spindle head S to perform a number of machining operations on a workpiece, as shown in FIGS. 7 and 8. For example, for the purpose of threading operations performed on a workpiece, arranged in a queue line on the guide way are a tool module for drilling operations, an inspection module for inspecting the depths of drilled bores, a tool module for tapping operations and an inspection module for inspecting broken taps in the drilled bores. Thus, in the present embodiment, the storage magazine 6 is adapted to store six series of modules, which perform a series of machining operations on workpieces of six sorts, on the six guide ways on the periphery thereof.

Secured on the hexagonal drum 104 are an index plate 110 and a ring gear 111 which is drivingly connected to an indexing motor 117 on the frame 100 through gears 112, 113, 114, 115 and 116, as shown in FIG. 10. The storage magazine 6 is rotated by the indexing motor 117 so that each of six guide ways may be indexed in order to the loading and unloading position A. The index plate 110 has six notches 118 corresponding to the six guide ways on the periphery thereof. An index plunger 120 which is driven by a fluid actuator 119 is slidably mounted on the frame 100 so as to be selectively brought into engagement with any one of the notches 118 to angularly position the storage magazine 6.

Secured on the hexagonal drum 105 is a circular plate 125, on which six different dog arrangements 127 are radially mounted at regular angular intervals to identify each guide way on the storage magazine 6 by means of binary codes designated thereby. A reader 126 is mounted on the frame 101 to read the binary code of the dog arrangement corresponding to the guide way disposed to the loading and unloading position A such that the limit switches 128 of the reader 126 are selectively operated by the dogs 127 designating the binary code.

FEED MECHANISM

The feed mechanism is provided to feed in regular sequence each module carried in a queue line on the guide way which is indexed to the loading and unloading positions A in accordance with a workpiece positioned on the rotary table 5 to be machined.

Six feed bars 130 are slidably mounted adjacent the plates 106 on the storage magazine 6 in parallel with the rails 107 and 108, respectively. The feed bars 130 secure a plurality of drive hooks 131 thereon at regular intervals, these drive hooks 131 projecting into openings 132 which are formed on the lower portion of the rail 107 and the plate 106 so as to come into engagement with the notches 23 formed on the flanges 22 of the modules. A block 133 having a notch thereon is secured to each of the feed bars 130 so as to face toward the rotation axis of the storage magazine 6. An arm 135 having a pin 134 thereon is secured to the feed bar 130 to rotate the same.

A base member 140 is securely mounted on and between the frames 100 and 101 at the ends thereof extending throughout the rotational center of the storage magazine 6. A bracket 141 is mounted on the base member 140 to secure a feed cylinder 142 thereon in parallel relation with the feed bars 130. Secured on the piston rod 143 of the feed cylinder 142 is a drive disc 144 which is in engagement with the notch of the block 133 to axially feed the feed bar 130. The operation stroke of the feed cylinder 142 is designed so as to be equal to the distance between two notches 23 on the flange of each module. Therefore, the modules are fed by one pitch per two strokes of the piston rod 143.

Another bracket 151 is mounted on the base member 140 to radially secure a cylinder 150 thereon which rotates the feed bars 130 through the arms 135 of which pins 134 are loosely engaged with a slot 154 which is formed on a hook-tilting block 153 in parallel with the feed bars 130 so as to be longer than the operation stroke of the feed cylinder 142. An opening 155 is formed across the slot 154 at the end portion of the hook-tilting block 153 so that the pins 134 may not collide with the block 153 when the storage magazine 6 is rotated. Accordingly, the feed cylinder 142 axially moves only the engaged feed bar 130 through the drive disc 144 and the block 133, while the cylinder 150 operates to rotate the feed bar 130 through the block 153, the pin 134 and the arm 135 to the position where drive hooks 131 are not engaged with the notches 23 of the tool and the inspection modules on the queue line which are indexed to the loading and unloading position A. Dogs D3 and D4 are fixed to the piston rod 143 to detect the operation ends of the feed cylinder 142 in cooperation with limit switches LS3 and LS4. Dogs D5 and D6, best shown in FIG. 8, are secured to the hook-tilting block 153 to detect the ends of rotation of the feed bar 130.

A circular projection 156 is formed except in the loading and unloading position A on a circular lock member 157 which is secured on the frame 100 opposite the feed bars 130. The notch which is formed on the hook member 131 of the left end of each feed bar 130 is loosely engaged with the circular projection 156 so as to restrain the feed bar 130 against axial displacement and rotation thereof except in the position A.

TRANSFER DEVICE

As mentioned hereinbefore with reference to FIG. 1, the first transfer device 7 serves to convey a new module from the magazine 6 for use at the spindle 65, while the second transfer device 8 serves to convey an old module which has just been used at the spindle 65 back to the magazine 6.

The first transfer device 7 consists of a first transfer conveyor C1 connected to the storage magazine 6 in the direction perpendicular to the rotation axis of the magazine 6 and a second transfer conveyor C2 connected to and between the first transfer conveyor C1 and the column 1 in parallel relation with the rotation axis of the magazine 6.

A pair of guide rails 160 of the first transfer conveyor C1 are mounted on the frame 100 as high as the rails 107 and 108 on the guide way which is indexed to the loading and unloading position A. The module which is carried on the left end of the indexed rails 107 and 108 is shifted and loaded to the pair of guide rails 160 by operation of the feed cylinder 142. A chain belt 163 is rotatably mounted in parallel with the guide rails 160,160 on sprocket wheels 164 and 165 which are driven by a first drive motor 162. A plurality of pawls 166, shown in FIG. 7, are secured to the chain belt 163 at regular intervals to engage and drive the module on the guide rails 160,160 to the second transfer conveyor C2. Thus, the first transfer conveyor C1 is constructed. Similarly, the second transfer conveyor C2 is constructed by a pair of guide rails 161 which is traversely connected to the guide rails 160, a chain belt 167 disposed in parallel relation to the guide rails 161, sprocket wheels 168 and 169 for carrying the chain belt 167, and a second drive motor 170 for rotating the sprocket wheels 168 and 169.

The second transfer device 8 consists of third and fourth transfer conveyors C3 and C4, which are mounted symmetrically with the second and the first conveyors C2 and C1, relative to the column 1, respectively.

TURNING PLATFORM

A pair of turning platforms 175 and 185, shown in FIG. 1, are mounted adjacent and on both sides of the vertical column 1 to turn the new module through 90° for use at the spindle 65, and also the old module, both of which are carried thereon, respectively. These platforms 175 and 185 are of the same construction and are synchronously moved. Therefore, only the platform 175 need be described hereunder with reference particularly to FIG. 11.

A frame 176 is located between the column 1 and the end of the second transfer conveyor C2 to pivotally mount a swivel arm 178 thereon by a shaft 177, parallel to the transfer direction of the second transfer conveyor C2, so that the swivel arm 178 may be rotatable within the extent of 90 degrees. A cylinder 179 is rotatably mounted on the frame 176 and the piston rod thereof is connected to the swivel arm 178 so as to rotate the swivel arm 178. A supporting plate 180 having a guide way thereon is secured to the end of the swivel arm 178 to carry the module moved thereto by the chain belt 167. The supporting plate 180 is rotated by the forward movement of the piston rod to the vertical state thereof so as to be positioned in the same plane with the clamps 33 and 34 of unclamping state. When the piston rod is retracted, the supporting plate 180 is rotated back to the horizontal state thereof to thereby be connected to the end of the second transfer conveyor C2, as shown by the phantom line of FIG. 11. The frame of the other turning platform 185 is located between the column 1 and the end of the third transfer conveyor C3.

MODULE CHANGER

A module changer 190 is located on the front of the column 1 to remove the old module from the spindle head S and simultaneously to move the new module into the spindle head S. Then, the old module is shifted to the turning platform 185, while the new module is shifted from the platform 175 to the spindle head S which has been moved by the feed motor 28 so that the clamps 33 and 34 of the spindle head S may be positioned in the same plane with the guide ways of the platforms 175 and 185.

The parts of the module changer 190 are described in detail with reference particularly to FIGS. 3, 4 and 12.

A cylinder 191 is mounted in parallel relation with the engaging surfaces 35 and 36 of the clamps 33 and 34, shown in FIG. 4, on the column 1 through a bracket 192. The piston rod 193 of the cylinder 191 is connected to a transfer rod 194 on which blocks 195 and 196 are fixed in spaced relation. Pawls 197 and 198 are pivoted on the blocks 195 and 196 by means of pins 199 and 200 so as to come into driving engagement with the new and the old modules, respectively, when the transfer rod 194 is rightwardly moved, as viewed in FIG. 3. Tensile springs 201 and 202 are connected to and between the blocks 195 and 196 and the pawls 197 and 198 so as to urge the pawls 197 and 198 in clockwise directions, respectively. When the transfer rod 194 is in its initial, or its left end position, the pawls 197 and 198 are disposed on the left sides of the new module on the rotated platform 175 and of the old module on the clamps 33 and 34, respectively.

One guide device having lower guide rollers 203 and an upper guide plate 204 thereon is mounted on the column 1 between the turning platform 175 and the spindle head S to guide the new module which is transferred by the pawl 197 from the supporting plate 180 to the clamps 33 and 34. Also, mounted on the column 1 between the spindle head S and the turning platform 185, another guide device having the same construction as the one guide device is provided to guide the old module which is transferred by the pawl 198 from the clamps 33 and 34 to the supporting plate 180 of the turning platform 185.

A positioning plate 211 having a cam surface 210 thereon is pivotally mounted by a pin 214 on the right guide plate 204 to position the module relative to the positioning pins 38 and 39 when the module is moved into the clamps 33 and 34, as shown in FIG. 3. The positioning plate 211 is rotatable within the extent defined by pins 212 and 213 and is normally urged in a clockwise direction to engage the stop pin 212 by a spring 215, which is connected to and between the plate 211 and the guide plate 204, thus permitting the module to be fed from the clamps 33 and 34 to the turning platform 185. A cam 216 is secured to the transfer rod 194 between the pawls 197 and 198 to counterclockwisely rotate the positioning plate 211 against the tensile spring 215 by the engagement thereof with the cam surface 210 so as to bring the plate 211 into abutting engagement with the module, thus stopping and roughly positioning the module relative to the clamps 33 and 34 when the module is fed into the clamps 33 and 34.

The traverse movement of the transfer rod 194 is confirmed by the engagement of limit switches LS7 and LS8 with a dog D7 on the transfer rod 194.

OTHER DEVICES

Other devices are briefly described hereunder, but are not shown because these devices are not essential with respect to the present invention and are well known to those skilled in the art.

A number of different workpieces are secured respectively to work pallets to be transferred to the machining station without distinction on the rotary table 5 and are identified by a workpiece-identifying device which transmits an identifying signal to a numerical control device, wherein a record means which stores numerical information for performing a series of machining operations on the identified workpiece, is selected in accordance with the identifying signal. The work pallets serve as carriers for transporting the workpieces to the machine tool and further as a reference base during the machining operation.

OPERATION

When the tape to control the machining operation for the identified workpiece W is automatically selected in accordance with a signal, the index plunger 120 begins to come out of engagement with the notch 118, and in turn, the indexing motor 117 rotates the storage magazine 6 and the circular plate 125 through gearings 116, 115, 114, 112 and 111. Each guide way on the hexagonal storage magazine 6 passing over the loading and unloading position A is identified by the reader 126 and the storage magazine 6 is rotated until the identifying code of the guide way accords the command of the tape. Under the accordance therebetween, the indexing motor 117 is stopped and the index plunger 120 comes into engagement with the notch 118 to thereby angularly position the selected guide way to the loading and unloading position A. Then, the block 133 of the feed bar 130 mounted under the indexed guide way comes into loose engagement with the drive disc 144, while the pin 134 is stopped at the position to loosely engage with the slot 154 of the hook-tilting block 153.

When the feed bar 130 is leftwardly moved, as viewed in FIG. 7, by the feed cylinder 142, the tool modules 10 and the inspection modules 75 are leftwardly moved by one-half of a predetermined transferring pitch, with the pin 134 moving in and along the slot 154. When the limit switch LS4 is operated by the dog D4, the cylinder 150 is operated to raise the block 153 to thereby rotate the feed bar 130 in a counterclockwise direction, as seen in FIG. 9, through the pin 134 and the arm 135, whereby drive hooks 131 are disengaged from the one of the pair of notches 23 on the flange 22 of each module. The retractions of the hooks 131 from the notches 23 are confirmed by the limit switch LS6 which is operated by the dog D6, and in turn the feed cylinder 142 returns to the initial position thereof. Then, the feed bar 130 is clockwisely rotated by the cylinder 150 to cause the drive hooks to come into engagement with the notches 23 again. When the engagements of the drive hooks 131 with the notches 23 are confirmed by the limit switch LS5, which is operated by the dog D5, the feed bar 130 is leftwardly moved again by the feed cylinder 142 to feed each tool and the inspection modules 75 through the remaining one-half pitch. Thus, the tool module 10 disposed at the left end of the rails 107 and 108 is loaded into the first transfer conveyor C1. The loaded module is used at the spindle head S in the first step of the series of matching operations, for example in a drilling operation.

When the tool module 10 is loaded on the first transfer conveyor C1, the conveyor C1 starts to transfer the tool module 10 to the second transfer conveyor C2 and in turn to the turning platform 175. The movements of these conveyors C1 and C2 are stopped when the workpiece is loaded to the turning platform 175. During these operations, the tools on the tool modules upwardly face in perpendicular relation to the direction of transfer thereof.

The tool module 10 is rotated through 90 degrees and brought down in the turning platform 175 so that the input shaft 13 thereof runs parallel with the rotatable spindle 50 and is disposed on the right side of the pawl 197, as shown by phantom line in FIG. 3.

Then, the transfer rod 194 is rightwardly moved by the cylinder 191 to thereby feed the tool module 10, then engaging the pawl 197 at its upper portion, from the supporting plate 180 through the guide rollers 203 to the clamps 33 and 34, which are in the unclamping position thereof, that is, being leftwardly moved a given distance from the position shown in FIG. 4. Before the transfer rod 194 reaches the right end of its movement, the cam 216 comes into urging engagement with the cam surface 210 to counterclockwisely and downwardly rotate the positioning plate 211. The tool module 10 is brought into abutting engagement with the positioning plate 211, whereby the positioning bushes 19 of the tool module 10 are coaxially positioned relative to the positioning pins 38 and 39.

When it is confirmed by the limit switch LS8 that the tool module 10 is held in the clamps 33 and 34, the turning device 175 operates to return the supporting plate 180 to its initial position and the clamps 33 and 34 are retracted by the operation of the cylinders 29, 29 to thereby bring the bushes 19 and 20 into positioning engagement with the positioning pins 38 and 39. Simultaneously, the tool module 10 is clamped on the sheet pads 40, 40 and the input shaft 13 of the tool module 10 is brought into driving engagement with the transmitting shaft 66 of the spindle 50 through the engagement of clutch teeth 69 and 12.

When the accomplishment of the clamping operation is confirmed by the limit switch LS2, the transfer rod 194 is leftwardly moved to its initial position, shown in FIG. 3, and in turn the drive motor 52 is operated to rotate the tool spindles 15, while the main table 3, the cross table 4 and the spindle head S are controlled in accordance with the numerical information for the identified workpiece W. Thus, the workpiece W on the rotary table 5 is machined by the tools 14 of the tool module 10.

Each time the tool module 10 is transferred form the first transfer conveyor C1 to the second transfer conveyor C2, the transfer mechanism repeats its operation cycle as aforementioned so that the inspection module 75 is loaded in the first transfer conveyor C1, in turn being transferred to the turning platform 175 through the second transferring conveyor C2. The inspection module 75 carried on the supporting plate 180 is turned 90° and in this position waits for the next transferring operation by the module changer. Further, in succession, another tool module to be used next at the spindle head S is loaded and is waiting on the second transfer conveyor C2.

When the machining operation by the tool module 10 is accomplished, the drive motor 52 is stopped and in turn the spindle head S returns to its normal position. The tool module 10 is unclamped by the forward movement of the clamps 33 and 34. When the limit switch LS1, as best shown in FIG. 5, is operated to confirm the accomplishment of the unclamping operation, the transfer rod 194 is rightwardly moved to thereby feed the tool module 10 from the clamps 33 and 34 by engagement with the pawl 198 to the turning platform 185 through the lower guide rollers 203 and the upper guide plate 204. The tool module 10 does not interfere with the positioning plate 211, since the positioning plate 211 is brought out of urging engagement with the cam 216 to thereby be upwardly rotated by the tensile spring 215.

Simultaneously with the transfer of the tool module, the inspection module waiting at the turning platform 175 is fed into the clamps 33 and 34 and in turn is clamped on the housing 26 of the spindle head S. The spindle head S is fed to and is vertically positioned at a commanded height relative to the workpiece. In succession, the cross table 4 is moved toward the spindle head S for causing the inspection nozzles 85 to inspect the depths of drilled bores and to simultaneously clean the bores.

The old tool module 10 which is carried on the turning platform 185 is turned 90 degrees and raised up to thereby be converted to the same situation as being loaded to the first transfer conveyor C1. In succession, the old tool module 10 is transferred to the end of the fourth transfer conveyor C4 through the third transfer conveyor C3 without relation to the operation of the first transfer device 7. The old tool module 10 on the end of the fourth transfer conveyor C4 is brought back to the rails 107 and 108 of the indexed guide way by the movement of the feed bar 130 simultaneously when a new module is transferred from the storage magazine 6 to the first transfer conveyor C1.

Such operation cycles are repeated and all operation cycles for the workpiece W are accomplished when the tool module or the inspection module which is last used is returned to the rails 107 and 108.

As aforementioned, the machine tool according to the present invention is provided with a polygonal and rotatable storage magazine 6, each guide way of which has supporting rails to movably carry a plurality of modules. In case each of the different workpieces needs several tool and inspection modules to be machined, these modules can be mounted longitudinally in a queue line on each guide way of the storage magazine 6. Since the supporting rails on each guide way of the storage magazine is on the same horizontal plane as the transfer conveyors when indexed to the loading and unloading position A, the modules on the supporting rails are easily removed from and returned to the storage magazine 6 by the simple transfer mechanism within the magazine 6.

Although certain specific embodiments of the invention have been shown and described, it is obvious that many modifications and variations thereof are possible in light of the above teachings. It is to be understood therefore, that within the scope of the appended claims, the invention may be practiced otherwise than as specifically described herein.

What is claimed as new and desired to be secured by Letters Patent of the United States is:

1. A machine tool, comprising:
   a column;
   a housing slidably mounted on said column, said housing having a rotatable spindle;
   a frame providing a horizontal pivot;
   a polygonal storage magazine mounted rotatably about said horizontal pivot and having a plurality of axial guide ways on the periphery thereof, each of said guide ways slidably carrying in a queue line a plurality of tool modules to perform a number of different machining operations on a workpiece;

a first transfer means located between one side of said polygonal storage magazine and said column for conveying a new tool module from said storage magazine for use at said rotatable spindle;

a second transfer means located between another side of said storage magazine and said column for conveying a tool module which has just been used at said rotatable spindle back to said storage magazine;

an index means for rotatably indexing said polygonal storage magazine so as to connect a selected guide way to said first and said second transfer means at both ends thereof;

a feed means mounted on said frame for feeding said new tool module from the front of said queue line on said selected guide way to said first transfer means and immediately to feed said used tool module from said second transfer means to the end of said queue line; and a changing means mounted on said column to remove said used tool module from said rotatable spindle and immediately to move said new tool module to said rotatable spindle.

2. A machine tool according to claim 1, wherein each tool module has tool spindles extending therefrom in a first direction perpendicular to the transfer direction thereof and an input shaft extending in a second direction thereon.

3. A machine tool according to claim 2, further comprising:

a first turning platform mounted between said first transfer means and said changing means for positioning said new tool module with said input shaft thereof being disposed parallel to said rotatable spindle, whereby said new tool module may be moved along a line parallel to said input shaft and toward said rotatable spindle by said changing means; and a second turning platform mounted between said changing means and said second transfer means for positioning said used tool module with said input shaft thereof being disposed perpendicular to said rotatable spindle, whereby said used tool module may be moved along said line in the opposite direction and thereafter conveyed by said second transfer means back to said storage magazine.

4. A machine tool according to claim 3, further comprising:

a clamp means mounted on said housing for clamping said tool module to said housing; and a clutch means driven by said clamp means for causing said input shaft to come into driving engagement with said rotatable spindle.

5. A machine tool according to claim 3, wherein said changing means comprises:

a transfer rod slidably mounted on said column;

a pair of spaced pawls pivoted on said transfer rod for engaging said new tool module on said first platform and said used tool module on said housing respectively; and an actuator for axially moving said transfer rod to feed said new tool module to said rotatable spindle and simultaneously to feed said used tool module to said second platform.

* * * * *